(12) United States Patent  
Rost

(10) Patent No.: US 6,217,177 B1
(45) Date of Patent: Apr. 17, 2001

(54) AUTOMATIC SIDE VIEW MIRROR TRACKING SYSTEM WITH REAL-TIME ANGLE CALCULATION

(75) Inventor: Rich Rost, Bayshore, NY (US)

(73) Assignee: Raul Tous, Newark, NJ (US)

( * ) Notice: Subject to any disclaimer, the term of this patent is extended or adjusted under 35 U.S.C. 154(b) by 0 days.

(21) Appl. No.: 09/060,805

(22) Filed: Apr. 15, 1998

(51) Int. Cl.[7] .................................................. G02B 5/04
(52) U.S. Cl. ............................ 359/843; 359/872; 359/877
(58) Field of Search .................................. 359/843, 841, 359/872, 844, 877

(56) References Cited

U.S. PATENT DOCUMENTS

| 4,679,158 | * | 7/1987 | Tate | 364/528.37 |
| 5,117,440 | * | 5/1992 | Smith et al. | 359/191 |
| 5,719,713 | * | 2/1998 | Brown | 359/843 |

* cited by examiner

Primary Examiner—Thong Nguyen
Assistant Examiner—Euncha Cherry
(74) Attorney, Agent, or Firm—Robert G. Lev

(57) ABSTRACT

An automatic side view mirror tracking system for an articulated vehicle relies upon three sets of ultrasonic transducers to develop distance measurements between two portions of the articulated vehicle. The angle between the portion of the articulated vehicle is calculated by relying on trigonometric algorithms depending only on the spacing of the transducers and the distance measurements developed by the ultrasonic transducers. Each transducer pair is configured so that both transducers are used for both transmission and reception. The transducer pairs are configured to receive reflected signals originated by other transducer pairs as well as the same transducer pair.

18 Claims, 10 Drawing Sheets

FIG. 11
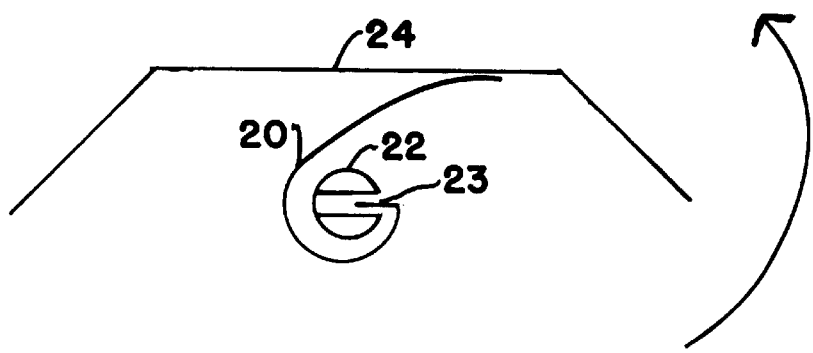
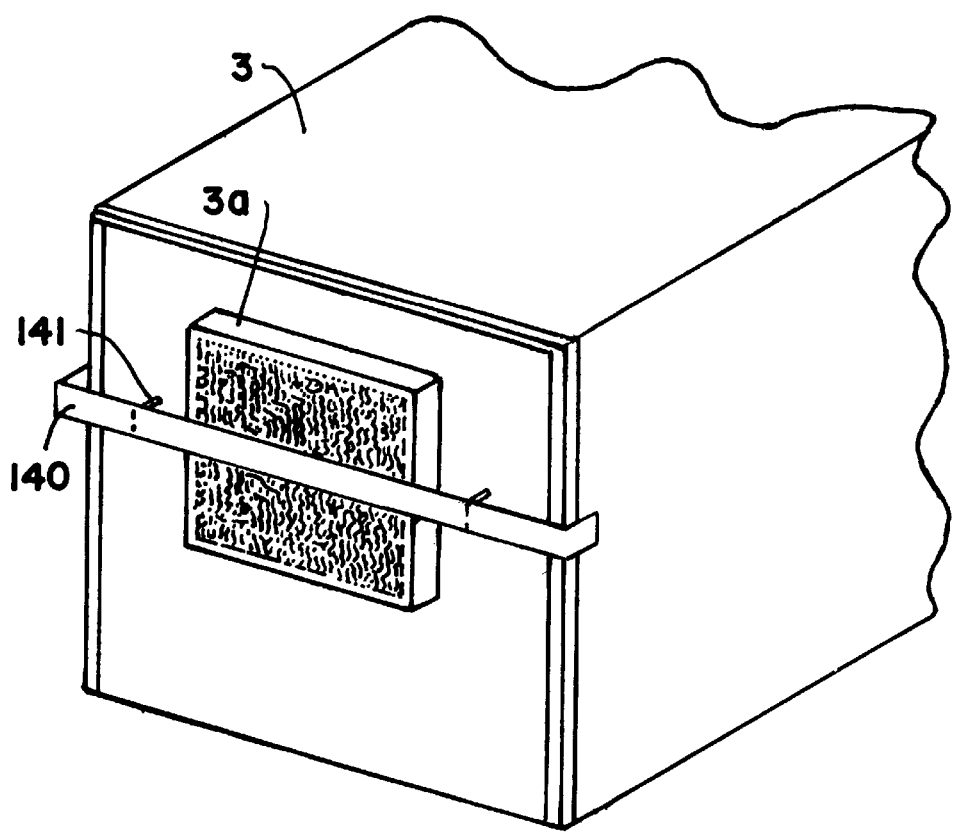
FIG. 13

AUTOMATIC SIDE VIEW MIRROR TRACKING SYSTEM WITH REAL-TIME ANGLE CALCULATION

TECHNICAL FIELD

This invention relates to automatic mirror tracking for side view mirrors on hinged vehicles such as tractor-trailers, camping trailers, boats on towed trailers and other articulated vehicles. In particular, the present invention is directed to a system which accurately measures the turning angle of a trailer and uses this measurement to accurately position a side view mirror keeping the drivers area of interest of the vehicle in the driver's view at all times.

BACKGROUND ART

A driver of a tractor-trailer rig, also known as a semi, which has a trailer portion large enough to obstruct the view directly behind the tractor, must rely exclusively on outside rear view mirrors to see the area behind the trailer. When such tractor-trailers are traveling forward on a road or highway, hand adjustable outside rear view mirrors are generally satisfactory for providing the appropriate view of the rear corners of the trailer. On such vehicles, the driver simply adjusts both outside mirrors by hand when the trailer is straight. A standard exterior side-view mirror normally provides only a limited field of view.

However, when the driver is maneuvering the tractor-trailer rig in close quarters, such as loading docks, and particularly when backing, the trailer is turned relative to the tractor so that the normal rear view from one of the fixed outside mirrors is usually partially or totally blocked by the bulk of the trailer. Further, the view from the other mirror is substantially divergent from the rear corner of the vehicle. This is known in the trucking industry as "blind side driving", and is a cause of many accidents costing millions of dollars annually.

One method of dealing with this situation is for the driver to make a series of small, incremental adjustments to the mirror for each few feet that the trailer is moved. With each move, the driver must get out of the tractor and walk beyond the trailer to check the progress, and adjust the mirrors accordingly. These steps are repeated many times until the trailer is satisfactorily parked or otherwise positioned. While this method is often instructed by trucking companies, and is considered mandatory by the U.S. Department of Transportation, it is seldom used by drivers for reasons of convenience and excessive time consumption. Instead, the "best guess" method is often used. To do this, the driver simply uses the extremely limited visual information available from the driver's seat and guesses the location of the trailer relative to the rest of the environment. This often results in many unnecessary accidents.

Previous attempts to solve these problems have been made by redesigning the mirrors themselves to include the use of wide angle or "fish-eye" lenses and the use of remote controlled rear view mirrors. With the former, the use of wide angle lenses results in substantial distortion of the driver's view, including loss of depth perception and detail. This makes the image available from such mirrors unreliable for close quarter or precise maneuvering.

One example of a remote-controlled mirror includes a four-way control provided so that the driver can manually adjust both of the mirrors in the horizontal and vertical axes from the driver seat. Such systems are generally not satisfactory since the driver is simply too busy to constantly adjust the mirror controls to compensate for the turning trailer while simultaneously guiding the tractor-trailer in its rearward course. Further, the driver is not always assured of the proper viewing angle while turning the tractor trailer.

One attempt to create an automatic mirror tracking control system is found in U.S. Pat. No. 5,132,851 to Bomar. This system utilizes a steering wheel linkage as a pick-up wheel to determine relative vehicle angles; an ultrasonic transducer; and a radio frequency control link to the servo motor effecting mirror movement. This system has certain drawbacks making the automatic tracking of the side view mirror problematical. First, a very complicated steering wheel linkage system is used which does not correctly reflect relative vehicle angles in a backing situation. For example, if a trailer is at some non-zero angle when the tractor starts to back up, the trailer will increase in turning angle relative to the tractor without the steering wheel being turned so that the increase in angle is not recognized by the system. Consequently, the steering wheel linkage would provide no information to the driver under such conditions. The calibration of the linkage to every type of tractor-trailer arrangement is an awkward and time-consuming task, mitigating against use of this system for a wide variety of tractor-trailer combinations.

The second embodiment is described in the text from columns 6, line 13 through column 9, line 38, referring to FIGS. 9–12. This embodiment is described as essentially retaining the features of the first embodiment but utilizing at least two transducers mounted on the tractor or cab and a microchip in the control unit. The control unit includes rotatable dials (117 and 118 in FIG. 9) to set the distances in feet and inches from the fifth wheel of the tractor to the left side mirror. The same is done for the distance between the driver and the left side mirror. The distance from the driver to the right side mirror is preferably set in a memory of the microchip at the factory. Further programming of the control unit is done by using push button 135 (in FIG. 9) to set the length of the trailer (the distance from the fifth wheel on the tractor to the center of the rear axle). A transmitting antenna 138 is used to transmit control signals from the control unit to the mirror.

A key aspect of the control unit 114 is the microchip that controls the operation of the mirror tracking system. The vehicle dimensions are manually input by the operator (distance from the fifth wheel of the tractor to the left side mirror and distance from the driver of the tractor to the left side mirror) and are stored in the memory of the microchip. The length of the trailer is also stored after being input using manual push buttons. This information, as well as the current angle between the tractor and the trailer is used by the microchip to generate an electric signal which is transmitted via a transmitting antenna to a receiver unit, which in turn transfers control signals to the mirror motor.

The transducers (170 and 171 in FIG. 12) are mounted on the rear portion of the tractor. Preferably, there are two transducers mounted approximately 4 inches above a plane determined by the top of the fifth wheel of the tractor (as depicted in FIG. 12). By measuring the time taken for the emitted ultrasonic sound waves to be reflected back to the transducers, the distance between the respective and the trailer can be determined.

It is noted that the precise techniques used to calculate the angle based upon ultrasonic emissions and receptions from the two transducers is not disclosed. However, the technique can be surmised as one involving the data manually input in the system as part of the installation process. These include in particular, null zone information based upon steering wheel position; the distance from the fifth wheel of the tractor to the left side mirror; the distance from the driver to the left side mirror; the length of the trailer. All of this information is necessary for calculation of the angle between the tractor and the trailer.

The Bomar system is described as requiring only one ultrasonic transducer to measure the distance and turning angle. However, the result is not always accurate since the measured distance decreases to a minimum at some turning angle depending on the location of the transducer, and then increases until 80° is reached. Consequently, when using a one transducer configuration, the direction of the turning trailer would not be known for a large portion of the turning radius centered around this minimum distance point since the data would start to repeat. The same result would occur even for two transducers spaced evenly apart from the center line of the vehicle. It is further noted that the radio-controlled mirror movement is not recognized by the system since there is no feedback mechanism indicating the exact position of the mirror. Consequently, some errors will always be introduced resulting in the driver not seeing the rear side corner of the trailer under some conditions.

The problems of mirror tracking for a backing tractor trailer are addressed by a similar system found in U.S. Pat. No. 4,679,158 to Tate. Like the Bomar system, the Tate system uses a steering wheel linkage, resulting in the same inaccuracies as described with respect to the Bomar system. This system also uses a stepping motor requiring a modulated pulse signal to move the mirror. This is activated by a radio frequency direction finding system with components mounted on both the trailer and the tractor. It is noted that accurate angle measurement between the tractor and the trailer becomes problematical for angles exceeding 60° due to the inside of the edge of the trailer interfering with the RF path to the receiver. Also, the rotating mechanical linkage is located next to the "fifth wheel" where large amounts of grease and dirt accumulate, making a long-term accuracy of this component problematical.

It is noted that both of the aforementioned conventional examples of automatic side view mirror tracking systems share limitations regarding accuracy and long-term operability, as well as other problems caused by complex mechanical systems. It is clear then that a safe and reliable automatic rear view mirror tracking control system is needed for semitrailers and other articulated vehicles. Such a control system should constantly adjust mirror angles to compensate for varying tractor-trailer angles occurring as the trailer is turned relative to the tractor. Further, this system should not interfere with the driver's primary task, i.e., controlling the vehicle, and should be accurate at all possible positions between the tractor and the trailer, as well as compensating for various incongruities between steering wheel position and tractor-trailer position. Such a system should not be susceptible to breakdown caused by the environment in which an associated vehicle operates.

A superior approach is found in allowed U.S. Pat. No. 5,719,713 to Brown. Unlike the aforementioned examples of conventional systems, the Brown system does not rely upon mechanical linkages to the tractor trailer rig in order to calculate the angle between the tractor and trailer. Rather, this function is carried out entirely by three sets of ultrasonic transducer pairs located equidistantly across the rear portion of the top of the tractor. In each transducer pair, each transducer servers as both transmitter and receiver. Each transducer pair receives only the signals originally irradiated by itself. Thus, the number of possible measurements is limited. The angle of the tractor to the trailer is derived using look-up tables that correlate the times measured by the transducers with tractor-trailer angles. However, the correlation of the time measurements to tractor-trailer angle changes for each size and shape of tractor-trailer configuration. Consequently, a substantial amount of set up time is necessary to correlate tractor-trailer angles for transducer measurements for each configuration of tractor-trailer that is to use the Brown system. Also, the mirror must be calibrated manually to adjust to trailer position each time the Brown system is activated.

Thus, while the Brown system overcomes many of the drawbacks of the conventional art, this system is far from optimal. In particular, initial calibration can be very cumbersome. Also, configuring the look-up tables for each configuration of tractor and trailer is time consuming and expensive. Further, the look-up tables themselves do not always directly correlate to the time measurements indicative of the actual tractor-trailer angle so as to provide immediate accurate angle calculations. Instead, a great deal of averaging and manipulation of the time measurements, as well as estimates of the angle measurements from the look-up tables, are necessary for the operation of the Brown device. Consequently, real time measurement of the actual tractor to trailer angle with precise corresponding mirror tracking can be delayed unless the angle between the tractor and trailer is changing very slowly. Therefore, there is still a need for an accurate real-time automatic side view mirror tracking system that does not depend upon configuration of the tractor-trailer or the use of look-up tables.

DISCLOSURE OF THE INVENTION

Accordingly, it is an object of the present invention to provide for a vehicle exterior side-view mirror tracking control apparatus capable of reliable real-time operation in the environmental conditions in which the vehicle operates.

It is a further object of the present invention to provide a vehicle mirror tracking control system which operates to provide accurate correlation between tractor-trailer angle and mirror position for smooth, accurate tracking of an exterior side-view mirror for an articulated vehicle regardless of the speed at which the angle between portions of the vehicle changes.

It is an additional object of the present invention to provide a mirror tracking control system that is capable of performing multiple, concurrent distance measurements between parts of an articulated vehicle to assure accurate real-time calculation of the angles between the vehicle parts.

It is another object of the present invention to provide a mirror tracking control system which can carry out real-time angle calculations between portions of an articulated vehicle without reliance upon pre-measured relationships between the portions of the articulated vehicle.

It is a further object of the present invention to provide a mirror tracking control system in which accurate angle measurements between parts of an articulated vehicle can be made regardless of the exact angle between the parts and without recourse to carrying out pre-operation measurements between the two parts of the articulated vehicle.

It is an additional object of the present invention to provide a mirror tracking control system which is accurate for all positions and attitudes between parts of an articulated vehicle, regardless of steering wheel position or any other mechanical configuration of the vehicle.

It is yet another object of the present invention to provide a mirror tracking control system which constantly and smoothly adjusts the mirror angle based upon changes in vehicle position and the actual position of the mirror.

It is still a further object of the present invention to provide a mirror tracking control system which does not require components mounted on the trailer of the tractor-trailer rig.

It is again an additional object of the present invention to provide a mirror tracking control system for a tractor-trailer in which the mirror is moved only for a predetermined amount of tractor-trailer attitude change, and jitter as well as other unnecessary mirror movements, such as backlash are controlled.

It is yet another object of the present invention to provide a mirror tracking control system which can be used on a variety of different tractor-trailer configurations without requiring individual set up or look-up tables for each tractor-trailer configuration.

It is still a further object of the present invention to provide a mirror control system for an articulated vehicle, in which measurements indicative of inconsequential or anomalous movement of the vehicle are ignored.

It is again an additional object of the present invention to provide a mirror control system for an articulated vehicle in which the measurements of the control system are not effected by vehicle configuration or the shape of the vehicle itself.

It is yet a further object of the present invention to provide a mirror control system for an articulated vehicle in which a pattern of mirror control operations can be analyzed.

It is again a further object of the present invention to provide a mirror control system for an articulated vehicle in which spurious measurements of the distances between portions of the articulated vehicle are eliminated.

These and other objects and advantages of the present invention are achieved by a mirror tracking control system arranged on an articulated vehicle having at least first and second portions. The control system includes a mirror mounted on the articulated vehicle where the mirror includes a housing, and a mirror moving unit connected to move the mirror responsive to control signals. The system also includes at lease three pairs of ultrasonic transducers arranged on a first part of the articulated vehicle where the ultrasonic transducers are arranged to provide sensory signals indicative of spacing between the first and second portions of the articulated vehicle. A control circuit is arranged for generating control signals in response to the sensory signals from the ultrasonic transducer. The control circuit has calculating means for calculating the angles between the first and second portions based upon at least one trigonometric algorithm.

Another aspect of the present invention is manifested by an automatic mirror position tracking system for use on an articulated vehicle having a first portion and a second portion. The system includes a mirror movably mounted on the first portion of the articulated vehicle, and a drive mechanism coupled to the mirror for moving the mirror in response to a control signal. The system further includes first, second and third pairs of ultrasonic transducers. Each pair of transducers is wired to operate as a single transducer to transmit ultrasonic signals and to receive ultrasonic signals reflected off of the second portion. Each of the ultrasonic transducers in each of the ultrasonic transducer pairs is directed at an angle in the range of 10–15° off perpendicular and away from each other. Each of the ultrasonic transducers arranged for receiving reflected ultrasonic signals is configured to receive ultrasonic signals from at least two ultrasonic transducers configured for sending ultrasonic signals. A control circuit is used for generating a control signal in response to the sensory output signals from the first, second and third ultrasonic transducer pairs. The control circuit is configured to carry out real-time calculation of the angles between the first and second portions of the vehicle.

A third aspect of the present invention is manifested by a method of adjusting a mirror to track changes in vehicle position for an articulated vehicle having first and second portions. The method is carried out using a system having a mirror, a motor for driving the mirror, means for detecting the position of the mirror, distance measuring means and a control circuit. The method includes a first step of obtaining vehicle distance measurements between the two portions of the vehicle. Using the distance data, the calculation of the angle between the first and second portions of the vehicle is made using at least one trigonometric algorithm. Based upon the calculated angle, the desired mirror position is determined, and the actual mirror position is detected. The mirror is adjusted if there is a predetermined difference between the calculated desired mirror position and the actual position of the mirror.

A forth aspect of the present invention is manifested by automatic mirror position tracking system for use on an articulated vehicle having a first portion and a second portion. The system includes a mirror moveably mounted on the first portion of the articulated vehicle, and a drive mechanism coupled to the mirror for moving the mirror in response to a control signal. The system further includes a radiating array for generating said control signal. A planar surface is mounted on the second portion of the articulated vehicle and aligned to receive signals on a straight line from the radiating array.

BRIEF DESCRIPTION OF DRAWINGS

FIG. 11 is a top view diagram depicting an anti-backlash mechanism of the present invention.

FIG. 13 is a diagram of the second portion of an articulated vehicle, depicting the radiation reflecting bar.

PREFERRED EMBODIMENTS FOR CARRYING OUT THE PRESENT INVENTION

Figure 1:
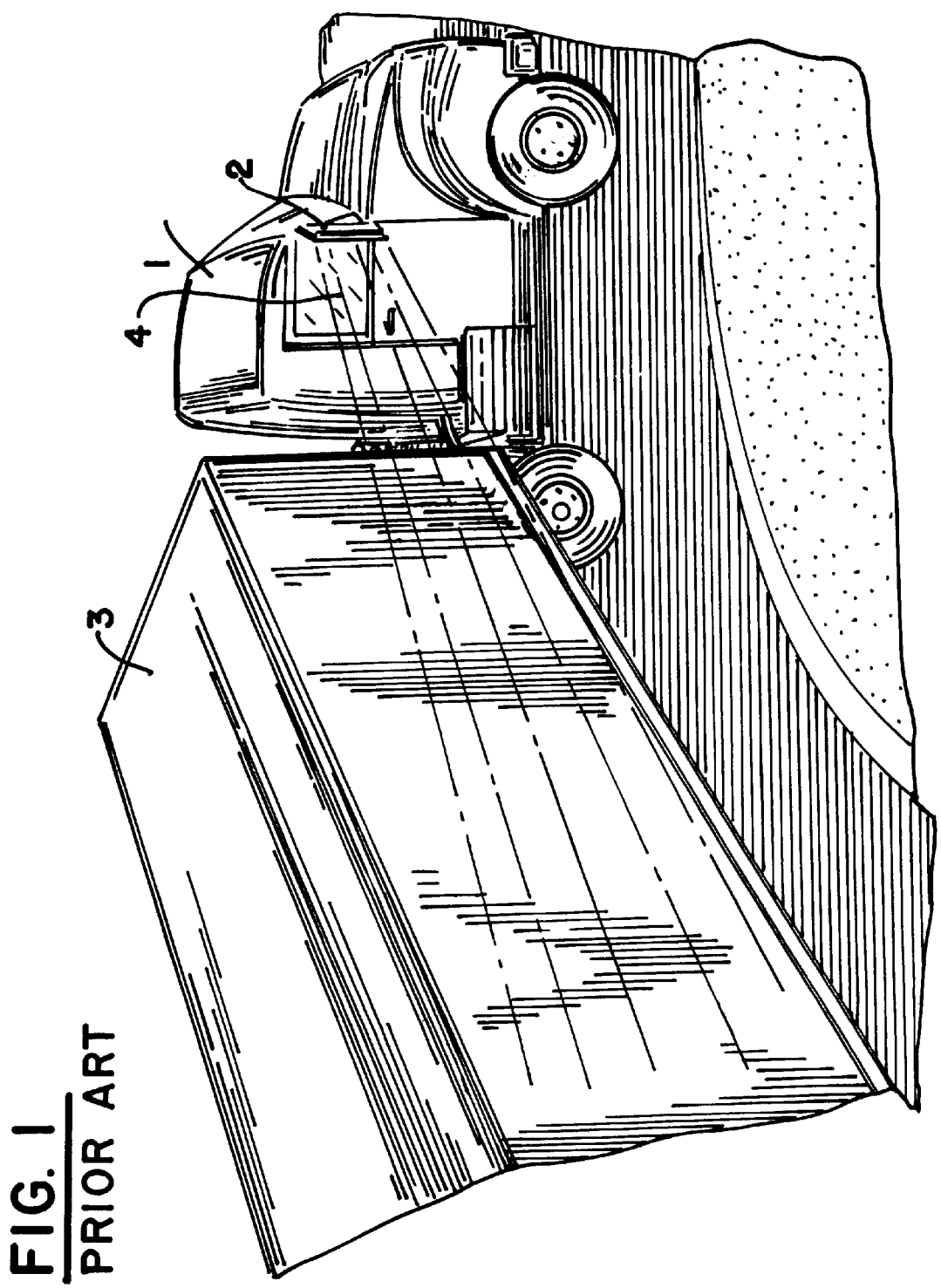
FIG. 1 is a diagram depicting a tractor-trailer turning a corner where an image of the side of the trailer is reflected onto a side view mirror.

The present invention is described with respect to tractor trailer system or rig as illustrated in prior art FIG. 1.

However, the following embodiments of the present invention can be applied to any articulated vehicle.

The most common use of the present invention is expected to be with tractor trailer rigs, also known as semis. While backing such vehicles at an angle, a variety of situations arise. Very often the vehicle driver (in tractor 1) finds that the rear side corner (opposite the driver) of the trailer 3 has been "lost" during the backing operation, and the driver is left with a view of some portion of the side of the trailer reflected along viewing line of sight 4 onto the side view mirror 2, leaving the vehicle operator with a view of only some portion of the side of trailer 3. This problem has been addressed in the aforementioned conventional art, through the use of side view mirrors 2 which are automatically adjusted in correspondence with the angle between the trailer and the tractor 1.

Figure 2:
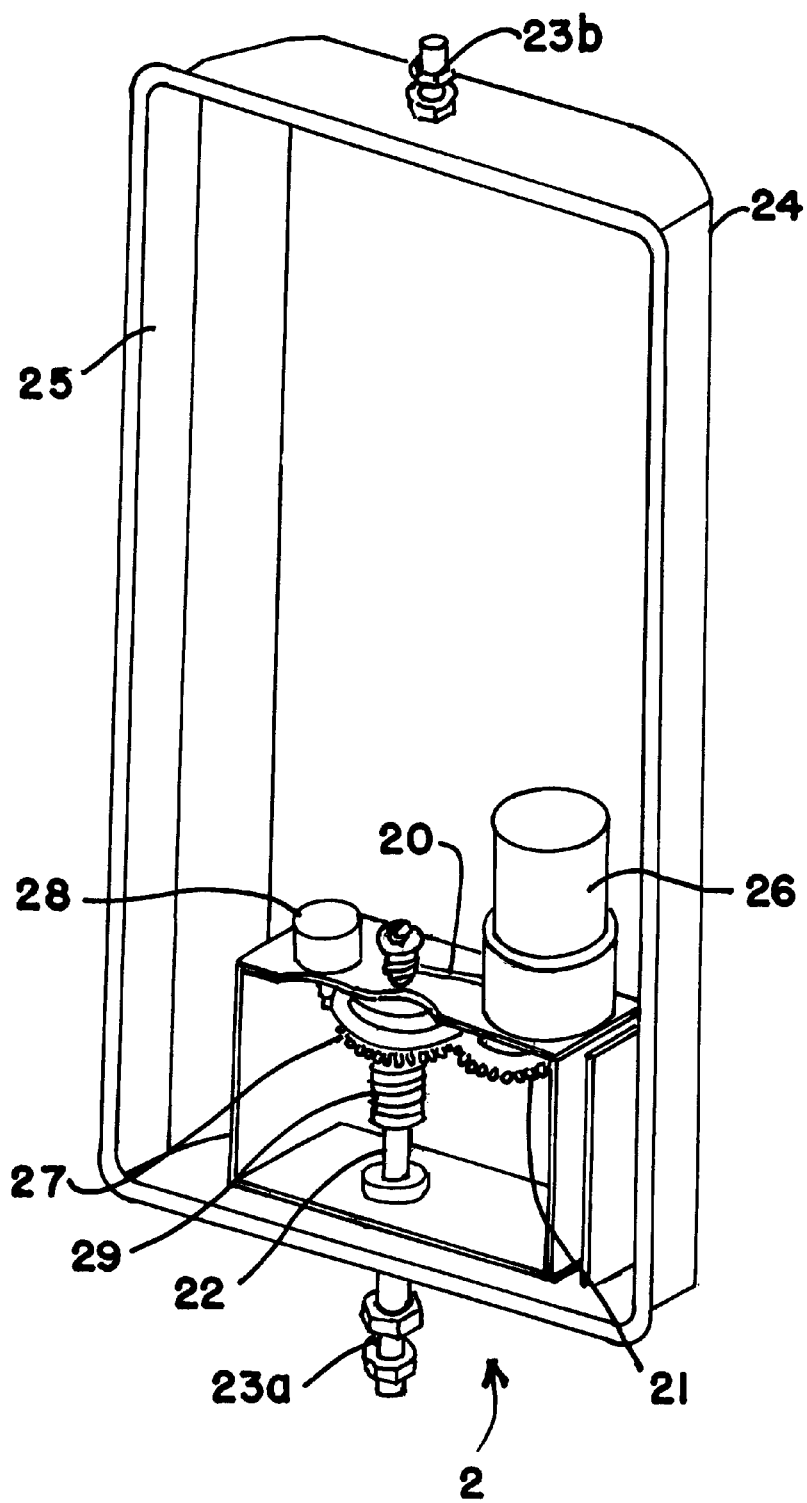
FIG. 2 is a diagram depicting the interior of a motorized mirror, including the housing and the major elements contained therein.

For a mirror tracking system to work properly, the rear corner of trailer 3 (on the side opposite the driver) must be kept in view of the driver through the rotation of mirror 2. Consequently, it is necessary that the mirror control system keep track of the movements of the trailer with respect to the tractor 1 so that the mirror can be moved accordingly. For this operation to be done properly the movement of the mirror must be smooth and regular. This is accomplished using the mechanism of FIG. 2, depicting the various components of mirror 2. These components include mirror surface 25 and housing 24 to contain the various elements necessary to move the mirror. The mirror 2 is supported by brackets (not shown) attached to the body of the tractor 1. The brackets are attached to stationary shafts, 23(*a*) and 23(*b*). One of the brackets is also used to carry the electrical connections (not shown) to the interior of the mirror housing 24.

Figure 5:
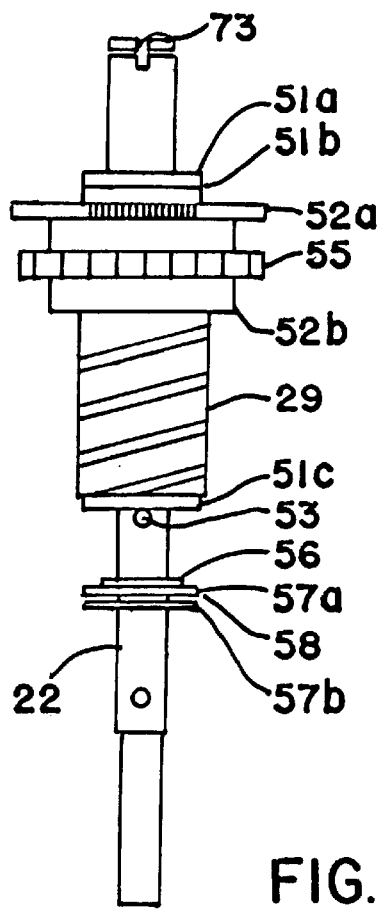
FIG. 5 is a detailed diagram depicting the power transmission shaft.

The mirror housing 24 (and thus the mirror surface 25) is rotated about stationary shafts 23(*a*) and 23(*b*) by means of a power shaft 22 which rotates with respect to the two stationary shafts but remains immoveable with respect to the mirror housing 24. The power shaft is rotated through the use of a DC motor 26. In the preferred embodiment of the present invention a 12 volt motor is sufficient for this purpose. The motor operates a drive gear 21 which turns a sector gear 27 which turns power shaft 22 through the use of a slip clutch 29. The use of the slip clutch and sector gear, as well as the additional mechanisms depicted in FIG. 5 provides a smooth turning operation of the mirror housing 24. A unidirectional torsion spring 20 controls backlash which is inherent to such arrangements. A potentiometer 28 is activated by the movement of the sector gear 27 in order to provide an electrical indication of the mirror movement, and thereby serve as a feedback mechanism.

A feedback mechanism to indicate the exact mirror position is important for the operation of the present invention. It is necessary to determine the actual position of the mirror with respect to its desired position so that a decision can be made with respect to the necessity of moving the mirror to maintain a view of the rear corner of the trailer 3. While a wide variety of feedback mechanisms performing such a function can be used, the environmental requirement imposed by truck operation render certain types of feedback mechanisms, such as a potentiometer 28, preferable for use with the present invention.

The potentiometer 28 is a variable resistor with a center tap output that is proportional to the number of turns from a fully clockwise or fully counter clockwise position. The potentiometer would be placed to mesh with the gears of the section gear. The motor movement is translated to the potentiometer 28 through potentiometer gears (not shown). Normally a voltage of five volts is placed across the two end terminals (not shown) of the resistor and the center tap output is measured by an analog-to-digital (A/D) converter. Since the resistance value at the center tap is proportional to the amount of turns, so is the voltage. This device is equivalent to an absolute encoder. This output would be read directly by the mirror control circuit 84 (FIG. 12) of the analog circuit 83 of microprocessor 81. It is noted that any other suitable feedback arrangement can be used in the present invention if circumstances permit.

Figure 8:
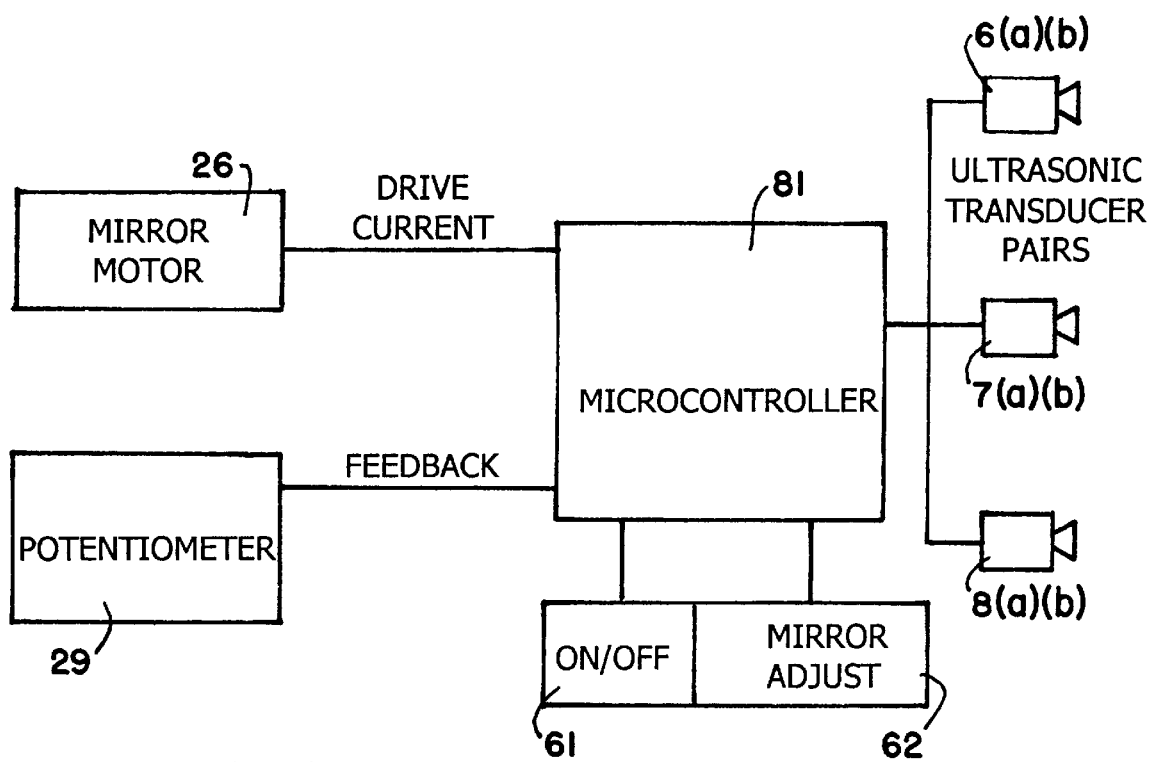
FIG. 8 is a block diagram depicting the electrical parts of the present invention.

FIG. 8 is a block diagram of a first embodiment of the present invention utilizing the aforementioned mirror structure and moving system as depicted in FIG. 2. This embodiment includes at least three transducer pairs (indicated as 6(*a*) (*b*); 7(*a*)(*b*); and, 8(*a*)(*b*)), and a microcontroller 81 to provide the automatic control of the mirror 2 based upon signals received from the transducers. A minimum of three transducer pairs, is necessary in order to calculate an accurate angle between the tractor 1 and the trailer 3 based upon distance measurement values derived from timing the echoes of each transducer configured for emission of ultrasonic waves. The microcontroller 81 calculates the angle of the tractor 1 to the trailer 3, derives a proper mirror position, and sends the appropriate drive signals to mirror motor 26. An accurate indication of the actual mirror position is supplied to the microcontroller 81 by means of a potentiometer 28.

Figure 6:
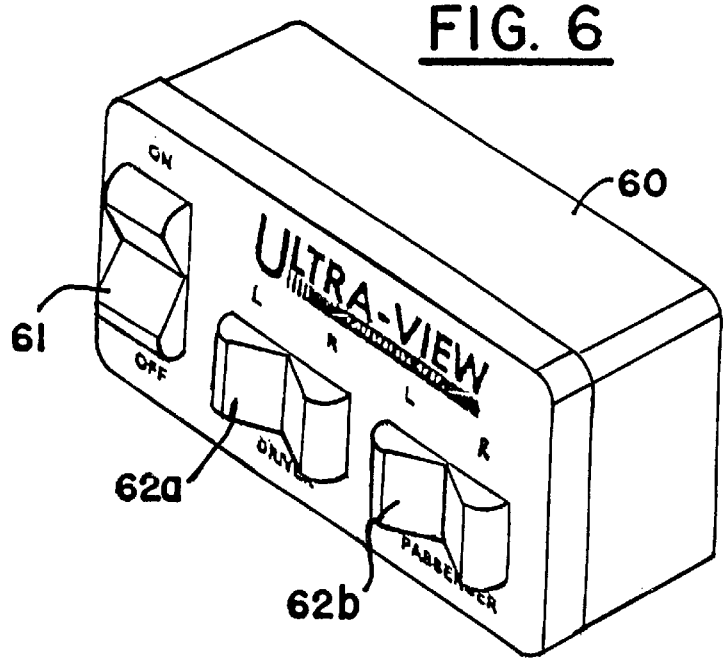
FIG. 6 is a diagram depicting a control console used with the present invention.

A control console 60 as shown in FIG. 6, is mounted in the tractor cab. This arrangement allows the vehicle operator to control certain aspects of the system operation. Using on/off switch 61, the system can be left on or entirely deactivated. One or both mirrors can be adjusted at any time while the system is on using switches 62(*a*), 62(*b*) to manually adjust passenger side and driver side mirrors.

Figure 3:
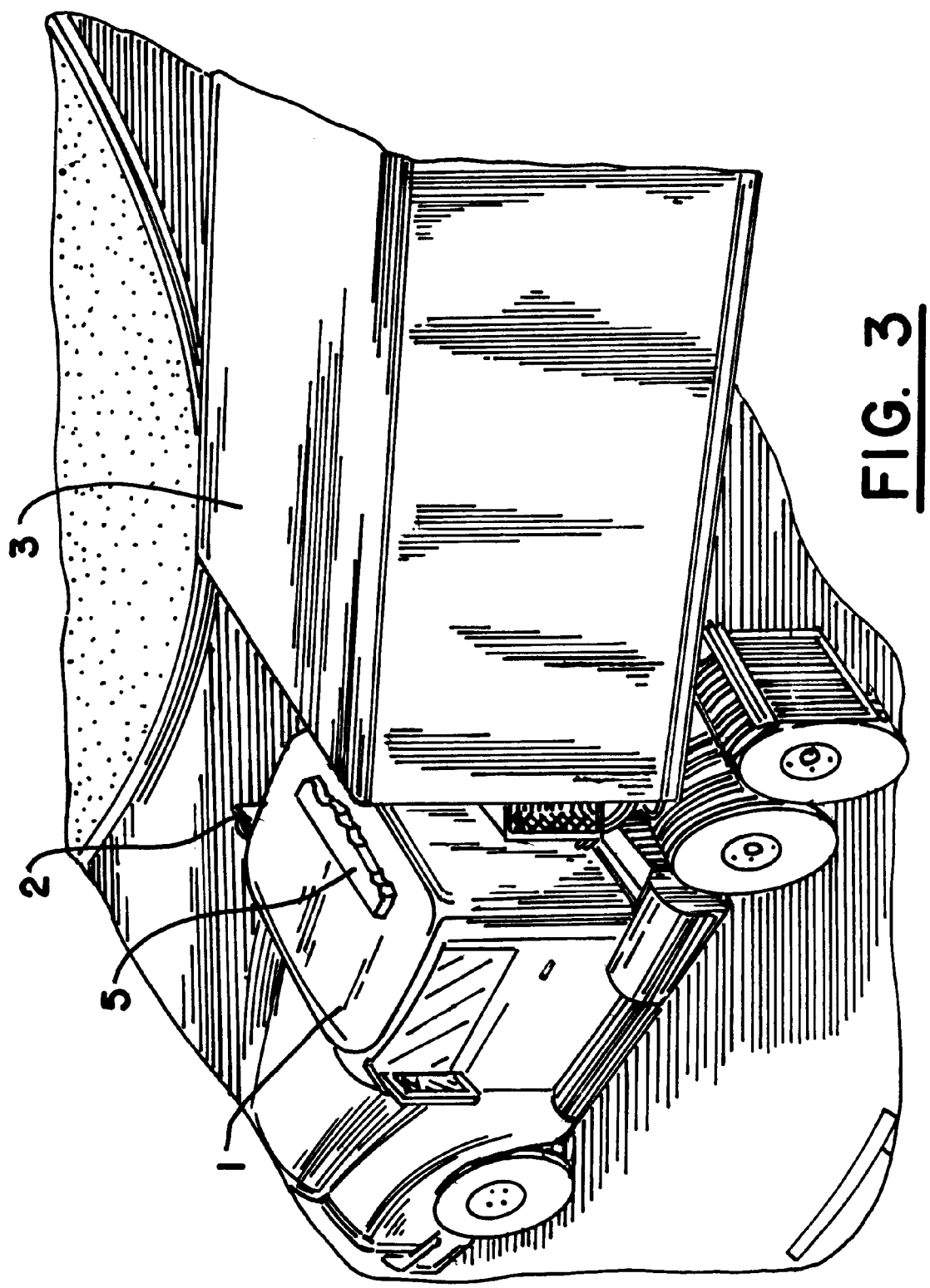
FIG. 3 is a diagram depicting transducer mountings on the tractor of a vehicle.
Figure 10:
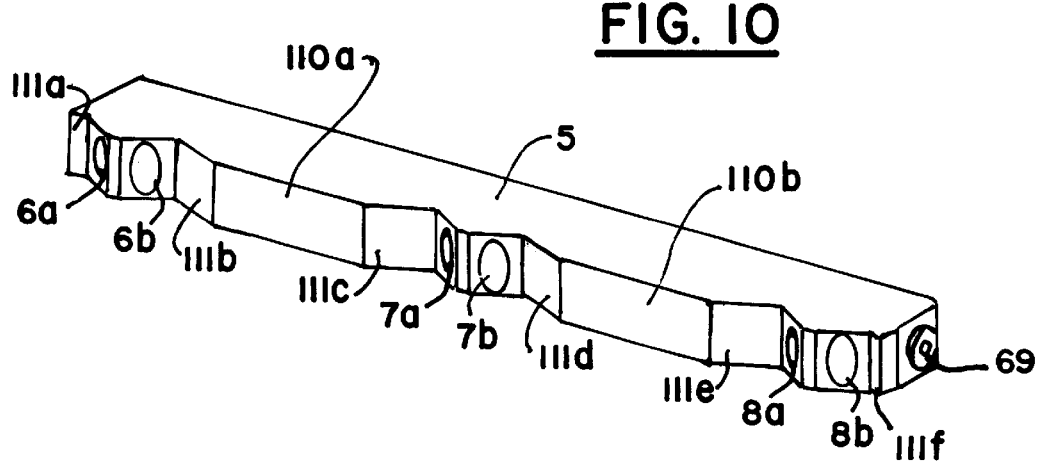
FIG. 10 is a diagram depicting the ultrasonic transducers bar of the present invention.

FIG. 3 illustrates the arrangement of a transducer bar 5 on the top of tractor 1. Each transducer bar 5 is preferably connected via a shielded cable 69 (in FIG. 10) to the control housing 70 illustrated in FIG. 7. Preferably the transducer bar is centered on the top surface of tractor 1. Such a configuration allows the most accurate reflection in the reception of signals with respect to the tractor 1 and trailer 3. Preferably, transducer bar 5 is constituted by ultrasonic transducers, arranged in three pairs, 6(*a*) 6(*b*), 7(*a*) 7(*b*), and 8(*a*) 8(*b*), as depicted in FIG. 10. Each of the outside transducer pairs is located equal distance from a center point between the center transducer pair.

Preferably, the transducer bar 5 is located near the rear wall of the tractor 1 and on the top surface of the tractor. The placement of the transducers on top of the tractor eliminates interference from wiring harnesses and air hoses connected between the tractor and the trailer. The tractor roof also has far less dirt and grease accumulation than the back of the tractor. Thus, the roof mounting results in less degradation of transducer performance.

While the transducers are preferably formed as part of transducer bar 5, this is not necessary to practice all embodiments of the present invention. In the alternative, discrete transducers or transducer pairs can be used. Further, while piezoelectric transducers for generating ultrasonic waves are preferred for the present invention, other devices for generating ultrasonic waves can be used. Nor is the present invention limited to ultrasonic radiation. In another alternative, other forms of radiation, such as electromagnetic radiation, including microwaves can be used. The trigonometric functions used in the calculations (based upon FIG. 9) can be used with electromagnetic radiation as well as with ultrasonic waves.

Preferably each transducer of the ultrasonic transducer pairs 6,7,8 are a piezoelectric type. When using a piezoelectric transducer, a minimum distance of at least 24 inches to an object is usually required to make a measurement. This is due to the transmitter's long "ring" time after the excitation pulse ends. Since this "ringing" would be picked up by the receiver, the input to receiving transducers is blanked for a predetermined amount of time covering the transmitter ringing duration. This blanking time determines how close an object can be detected since it is the travel time of the ultrasonic pulses that is being used to measure distance.

The transducers can be mounted on the upper third of the rear wall of the tractor if distances between the tractor and the trailer permit proper measurements (a distance of least 24 inches) while the rig is straight. As previously stated,, such rear wall mounting on the tractor is also contingent upon the environmental conditions with respect to dust, grease and fixtures (such as refrigeration units) between the tractor and the trailer.

A minimum of three transducer pairs 6,7, and 8 are used to measure distance between the tractor and trailer at three points. One transducer pair must be located on the center line of the tractor, and the two other transducer pair are positioned on either side, approximately two feet from the center line, either as part of an integrated transducer bar 5 or as discrete transducer pairs 6,7, and 8. Locating the side transducer pairs two feet from the center line is done to maximize variation in measured distance between the transducers but also keeps interference from exhaust stacks located on the outside edge of the tractor to a minimum.

The relative position of the transducers with respect to a theoretical center line on the tractor is important since the algorithms used by the microprocessor 81 to calculate turn angle is based upon the transducers being positioned a predetermined distance apart.

One example of ultrasonic transducers that can be used are piezoelectric devices from Murata Erie, No. MA4OE7R/S, or Polaroid, No. 9000. Such transducers are sealed and designed to handle high vibration, shock, extreme temperatures and weather conditions that would exist around the exterior of a truck. Electrostatic transducers (or any other ultrasonic signal generating/receiving device) can be used in the present invention instead of piezoelectric transducers. However, the delicacy of existing electrostatic transducers renders their use on the exterior of a tractor-trailer rig problematical.

Preferably, the piezoelectric transducers will have a full beam width of 15° along the vertical axis and 40° along the horizontal axis. This results in an elliptical radiation pattern. When the tractor and the trailer are lined up (a 0° turning angle) the radiation pattern is uniform. However, as the angle between the tractor 1 and the trailer 3 increases, the pattern of radiation impinging on the trailer becomes irregular. It is noted that obstructions such as airfoil brackets and horns must also be kept out of the horizontal beam path. Preferably the transducers radiate an asymmetrical ultrasonic pattern. However, symmetrical radiation patterns can also be used.

Since there are many tractor-trailer configurations, more transducers can be added to eliminate any ambiguity in measurement (caused by obstructing structures on the tractor-trailer) that cannot be resolved with three transducers. Each transducer is preferably connected to the computer via a shielded conductor at 69 (in FIG. 10) to eliminate false indications in the pulse echo detection circuits caused by external interference or other environmental factors.

Figure 7:
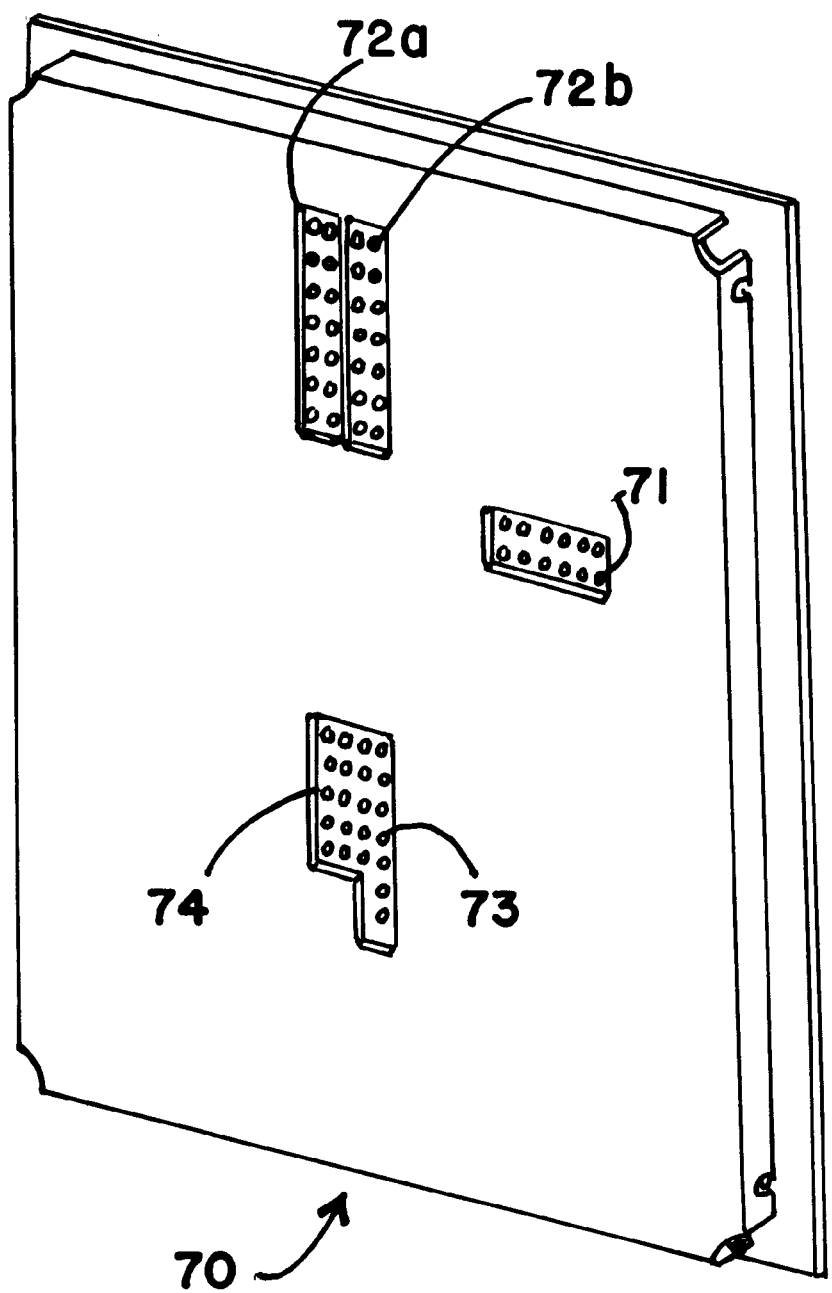
FIG. 7 is a diagram depicting a controller box containing the control circuitry of the present invention.
Figure 12:
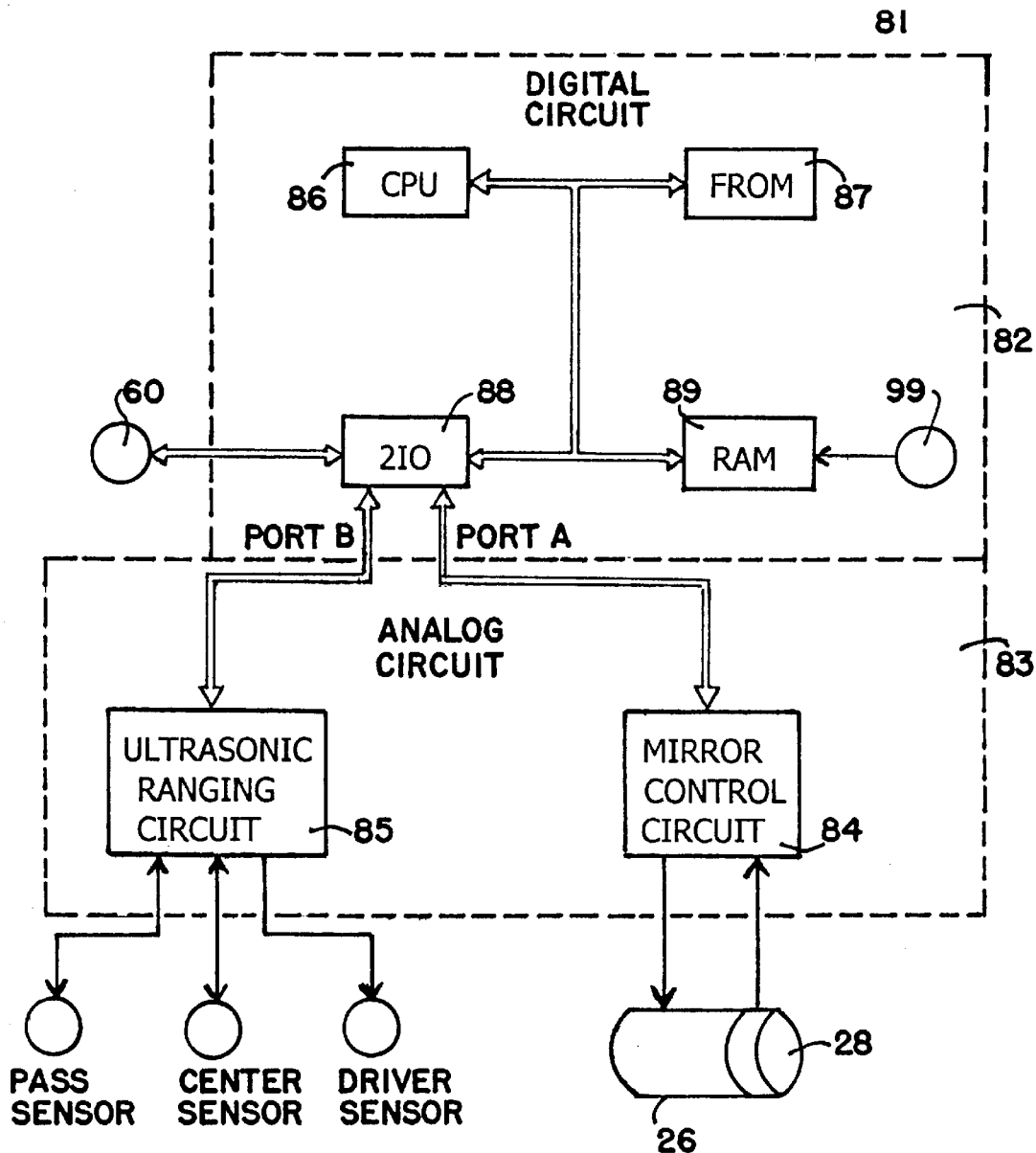
FIG. 12 is a block diagram depicting elements of the control circuit used as a part of the present invention.

Microcontroller 81 (of FIG. 8) is depicted in greater detail in FIG. 12. The digital calculating portion 82 of the microcontroller 81 is constituted by a CPU 86 which can use a PROM 87 and a RAM 89 for memory capacity. The calculating portion of the microcontroller can be programmed so that each mirror adjustment is stored in the memory, preferably PROM 87. However, another type of memory can be added to the controller of FIG. 12 so that a full record of mirror adjustments is stored. The stored record of mirror adjustments can be downloaded from control circuit 81 by means of a RS232 serial port 74, as depicted in FIG. 7. In this manner, mirror adjustments for one truck can be transferred to the mirror control system of another truck. Also, such records allow detailed consideration of the mirror control system operation for purposes of fine-tuning of the system.

An input/output processor 88 handles input signals from the ultrasonic ranging circuit 85 and outputs control signals to the mirror control circuit 84. The input/output processor 88 also receives control signals from the control console 60, previously described. The analog portion 83 of the microcontroller 81 includes the ultrasonic ranging circuit 85 and the mirror control circuit 84. CPU 86 handles all the calculations and driver interface controls. One example of a microcontroller is a Zilog Z80180 microprocessor that uses 32K of ROM and 32K bytes of battery-backed RAM, as well as a Z84C9010 input/output integrated circuit. Two 8-bit ports from I/O integrated circuit are configured to handle all inputs and outputs from the mirror control and transducer circuits.

The ultrasonic transducer circuits 85 can be constituted by Texas Instruments Sonar Ranging Control Integrated Circuits, TL852 and TL853, along with some discrete components. The TL853 provides sixteen 40Khz transmit pulses receiver blanking time and digital gain control for receiver TL852. The TL852 provides variable gain, variable bandwidth amplification and echo detection circuits. Initiation of the transmit and blanking time to the TL853 as well as measurement of echo return time is all controlled by the CPU 86.

FIG. 10 depicts the transducer bar 5 of the preferred embodiment of the present invention. This bar contains three sets of ultrasonic transducers 6(*a*) 6(*b*), 7(*a*) 7(*b*) and 8(*a*) 8(*b*). The outputs of the transducers, as well as the power for the transducers is supplied at power cable coupling 69. Preferably the cable connecting the transducer bar 5 to the control panel 70 (as depicted in FIG. 7) is shielded and/or armored for maximum protection. The two outside ultrasonic transducer pairs are spaced the same distance from the center ultrasonic transducer pair for reasons explained previously.

Rather than being in the same plane, the two transducers of each transducer pair 6,7,8 are directed to have an angle of approximately 10–15° away from the 0° plane (the plane parallel to the rear surface of the tractor 1) and each other. This design provides a much wider beam pattern in the horizontal plane.

It is common practice to mount sets of ultrasonic transducers on a single mounting bar. For the present system mounting such a bar on a tractor cab is usually much easier and more efficient than mounting individual transducer pairs 5. However, there is a price that accompanies relatively easy assembly of the ultrasonic transducer configuration to the cab. The bar upon which the transducer pairs are mounted (especially parallel surfaces 110(*a*), 110(*b*) becomes a source of additional reflection and can create false echos that might be interpreted by the receiving transducers as real reflections from the trailer. This situation can be controlled by sloping any surface on the sensor bar that faces the trailer, such as 111(a)–111(f). This is done to avoid, as much as possible, surfaces that are parallel to the front wall of the trailer as is done with surfaces. Another way of reducing false echos is to roughen the face of the bar upon which the transducers are mounted.

The mirror control circuit 84 can be constituted by Hewlett-Packard HCTL-2016 interface circuit, an Allegro 2998 dual full-bridge motor driver circuit connected to the motorized mirror, and a comparator for motor overcurrent protection. An overcurrent circuit warns microcontroller 81 that there is an obstruction preventing the mirror from rotating since the motor current increases under a heavy load. A current of 265ma is considered high for these motors, and constitutes the level at which the comparator will switch power from the motor. During the mirror adjustment operation, the mirror control circuit 84 receives electrical signals from the potentiometer 28, to serve as feedback signals indicative of a change in mirror position.

The aforementioned components are specified only by way of example, and to indicate one way that the present invention could be constructed. The aforementioned selection of circuit components is not definitive of all possible circuit components and arrangements used to carry out the present invention, but only serves as an example of one manner in which the skilled practitioner could effect operation of the present invention.

The control housing 70, enclosing all of the elements of controller 81 is depicted in FIG. 7. The control housing can be located in any convenient portion of the cab of tractor 1. The control housing can accommodate independently and automatically controlled mirrors on both the driver side and passenger side of the tractor. This are accommodated using pin connectors to which the 72(a) and 72(b) ultrasonic sensors are connected. Power is connected at pin connector 73. Downloading of the controller memory is accomplished with an RS232 serial port 74. Hard wired connection (not shown) is used to connect the control housing 70 to control panel 60 as depicted in FIG. 6. This can also be accomplished using pin connector 71.

Figure 4:
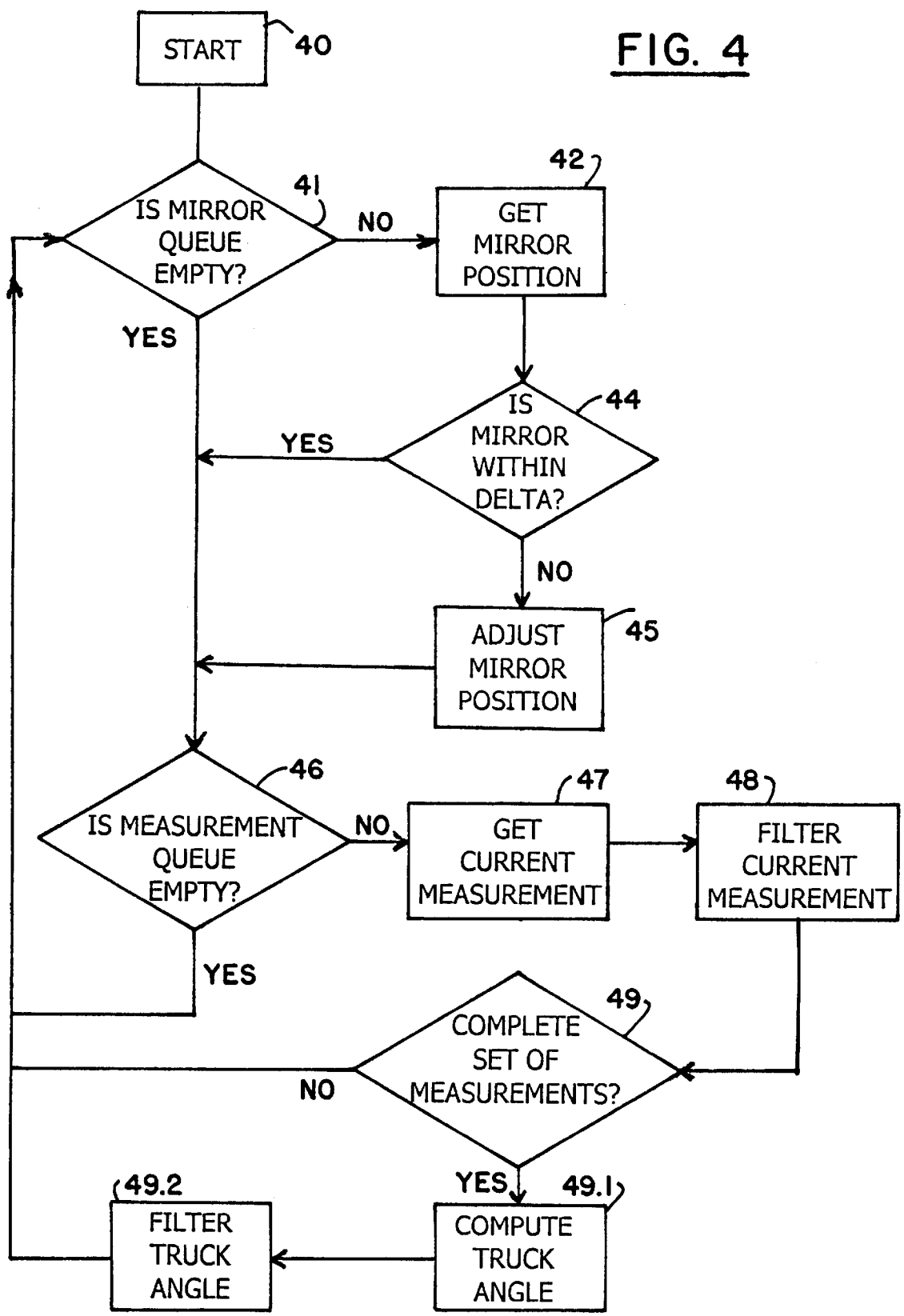
FIG. 4 is a flow diagram depicting the operation of the present invention.

In order to adjust the mirror, the angle between the tractor and the trailer must be calculated. For this to be accomplished, the distance between each of the transducers and the front of the trailer must be measured. The operation of the control circuit depicted in FIG. 12 is illustrated by the flow diagram of FIG. 4. Step 40 occurs when the driver activates the system.

At step 41 a first check is made to obtain correct orientation of the mirror. This is done by determining if the mirror queue or buffer memory (such as RAM 89 in FIG. 12) is empty of data regarding the mirror position. The data for this buffer is obtained from the feedback mechanism (potentiometer 28), indicating the actual position of the mirror. The mirror buffer or queue normally contains the last three measurements indicative of mirror position. Generally mirror position information is contained in a circular buffer containing three entries with no coefficients. In the preferred embodiment, the mirror position information is not filtered or otherwise averaged by standard statistical methods normally used in signal analysis. The mirror position is preferably obtained by using the latest measurements stored in the circular buffer. Normally the required or desired mirror angle is computed by adding an offset to the mirror home position (the required mirror position for a 0° angle between the tractor and the trailer). This offset is computed based upon filtered or averaged truck angle measurements.

At step 44 a determination is made if the mirror position is within predetermined tolerances, designated as Delta. Preferably, the value of Delta is ±0.75° of the required mirror angle. If the position of the mirror is not within the required tolerance of the desired position, a decision is made in the digital circuit 82 to instruct the mirror control circuit 84 to send an activating signal to motor 26 to move the mirror within the Delta tolerance. Instantaneous feedback from the encoder 28 will determine if the adjustment at step 45 has positioned the mirror within the desired Delta tolerance.

If the mirror queue is empty (step 41) or the mirror is within the Delta tolerance (step 44) or the mirror has been adjusted, a determination is made at step 46 if there is data in the measurement queue. Like the mirror queue, the measurement queue is maintained by a circular buffer that can be located in any number of different portions of the control circuit 81. Preferably, this buffer will contain the four most recent distance measurements provided by the output of the ultrasonic transducers of transducer pairs 5 that are configured for receiving reflected ultrasonic signals. If the measurement buffer is empty, the logic of the process returns to a check of the mirror position buffer at step 41.

If, on the other hand, there is data in the measurement queue, at step 47, the most recent measurement provided by the ultrasonic transducers is obtained from the measurement queue or buffer. At step 48, the current measurement is filtered or averaged using standard statistical techniques based upon the four entries in the measurement queue. In one variation of the preferred embodiment, the four measurements in the measurement queue are "weighted" with coefficients of, for example, 1,2,4 and 1, corresponding in order from the oldest to the newest measurement stored. However, such "weighting" is not necessary for the successful operation of the present invention and is merely an option that can be used to compensate for various environmental conditions. Once all of these values have been subjected to standard statistical methods, such as averaging, in order to filter the current measurement at step 48, a determination is made if a complete set of time measurements from the ultrasonic transducer pair 5 has been stored in memory (step 49). If not, the logic of the process goes back to step 41 to determine if the mirror position is still correct.

If, on the other hand, a complete set of measurements have been received, the truck angle is computed at step 49.1. Preferably, five distance measurements are obtained. These include a transmission from the passenger/transducer pair to produce receipt of an echo at the passenger side and center transducer pairs. Also included is the transmission from the center transducer pair to produce received echos on the center and driver/side transducer pairs. Finally, a transmission from the driver/side transducer pair produces a received echo signal on the driver/side transducer pair. It should be noted that while this sequence of transmissions and receptions is used as part of the preferred embodiment, it is not necessary for the proper operation for this sequence to be used. Rather, a number of different sequences between the transmitting transducers and the receiving transducers can be applied through the operation of the present invention.

This criss-cross measurement technique (receiving reflected signals from other transducer pairs) is used to overcome the problem of signal loss due to acoustical phase cancellation. Further, the additional combinations increase the chance of maintaining sufficient reflected or echo signal strength to produce a proper angle calculation.

Separate timers are used for each ultrasonic transducer pair 5. Each time that an echo is received at a transducer pair, the respective timers are stopped and an interrupt signal is generated indicating that a timing measurement has been completed. After transmission the respective timers for the transducer pairs 5 are reset. Thus, once the echos are received at the respective transducer pairs, respective timers are stopped and interrupt signals are generated indicating that the measurement has been completed.

The use of averaging or filtering (both "weighted" and "unweighted" coefficients) is for the purpose of controlling jitter in the required mirror position. Such jitter would normally result if there were rounding errors in the mathematical routines for the calculations that correlate mirror movement to the changing angle between the tractor and the trailer. As a result of this filtering, the operation of the present invention is smoother and more accurate than that of conventional systems.

Figure 9:
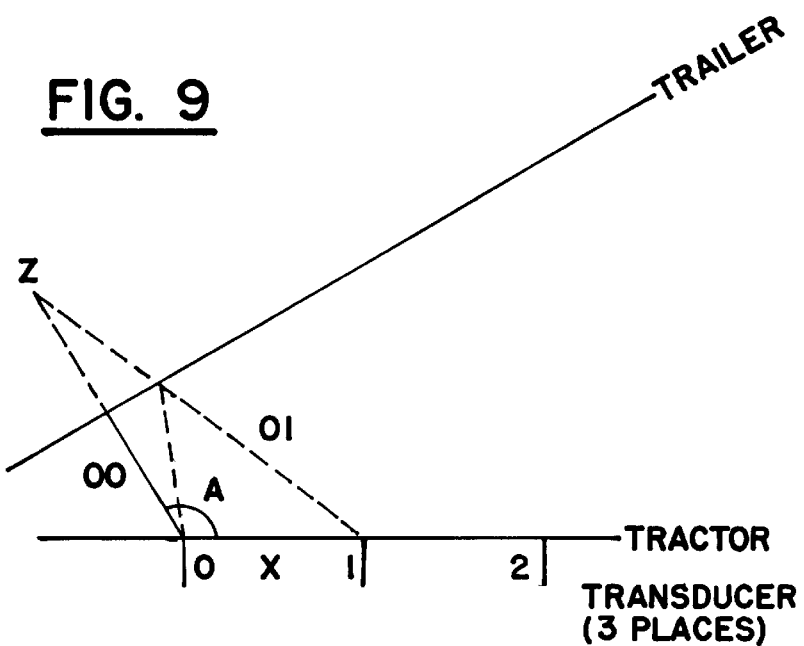
FIG. 9 is a diagram used for the derivation of an algorithm used as part of the present invention.

The computation of the angle between the tractor and trailer at step 49.1 is carried out using trigonometric algorithms. One example of the derivation of at least one such algorithm is found in FIG. 9. In this diagram arc A is indicative of the angle between the tractor and the trailer. Line segment 0–1 is the distance between the passenger side transducer pair and the center transducer pair. Line segment 1–2 is the distance between the driver side transducer pair and the center line transducer pair. As depicted in FIG. 9, the solid line 00 is the round trip path that the sound takes from transducer 0 to the trailer and back to transducer 0. The lines with short dashes labeled 01 represent the path the sound takes when transmitted from transducer pair 0 to transducer pair 1. If these paths are rotated 180° from transducers 0 to where they would strike the trailer, the result is a triangle having corners 01Z. Since the lengths of all three sides of the triangle are now known, angle A can be calculated according to the following formula.

$$A = (ArcCos(([0Z]^2 + [01]^2 - [1Z]^2)/2 \times [0Z] \times [01]))$$

The truck angle is calculated by subtracting 90° from the calculated angle A.

Approximately seven other algorithms can be used to calculate the angle between the tractor and the trailer. Three of these are depicted below while the others are depicted along with illustrated drawings in Appendix II (attached to this application).

$$\text{Truck Angle} = ArcSin(([11] - [00])/[X])$$

$$\text{Truck Angle} = ArcSin(([22] - [11])/[X])$$

$$\text{Truck Angle} = ArcSin(([22] - [00])/(2 \times [X]))$$

It is noted that X is the distance between the transducers. The distances shown on the drawing are not to any particular scale and were simply used to validate the accuracy of the subject equations. It is further noted that any combination of the equations can be used in the calculations. It is not necessary that all eight equations either those depicted or those appended to this application be part of the calculation. It is only necessary that at least one trigonometric algorithm be used for calculating the angle between the tractor and the trailer. It is noted that the only information necessary to use these algorithms is the spacing between transducers and the distance measurements generated by the transducers. As a result, a simplified calculation system is achieved compared to those used conventionally.

At step 49.2 the calculated truck angle is filtered by throwing out any calculated truck angles that are considered aberrations to a running average of the calculated truck angles. Also the various truck angle calculations are "weighted" depending upon the order in which they are generated in order to provide the most accurate calculation based upon well-known statistical methods.

A change in truck angle will create a change in required mirror position, which is checked once the logic of the process returns to step 41 and repeats the calculations necessary to properly adjust the mirror in response to a change in the angle between the tractor and the trailer. In the preferred embodiment, the relationship between the filtered truck angle and the mirror angle is that for every 1° of change in the filtered truck angle, the mirror angle is changed by 0.5°.

One factor causing irregular mirror movement is backlash. This is a condition that causes a dead spot in a mechanical system when it reverses direction, and with the present invention could cause gear teeth to unmesh and then remesh during the change in direction. This is controlled in the present invention by applying a rotational preload to the system which maintains the mesh in one direction because the gear teeth are pushing, and maintains tension in the opposite direction because the rotational preload is taking up the slack in the teeth. The preload is illustrated in FIG. 11, and is constituted by spring 20. The applied force F is created by the spring 110 which exerts a force in the opposite direction of the motor 26 by virtue of having one end attached to power shaft 22 by means of slot 73. The second end of the spring is attached to backwall 24 of the mirror housing.

Undesired movement in the mirror can also be controlled using viscous damping by way of a rotational shock absorber applied in conjunction with gear head 27 (in FIG. 2). Thus, if additional rotational vibration should be generated (for example by vehicle movement) that vibration can be controlled by the rotation of the damper.

Another technique for controlling unwanted mirror movement is through the use of electronic or dynamic breaking. This is achieved by configuring the mirror control circuit 84 (FIG. 12) so that as soon as a control signal to drive the motor is no longer extant, the mirror control circuit automatically carries out a switching operation connecting the mirror motor 26 to an electrical load. The motor which is not yet stopped due to momentum (even though power to the motor has been cut off), will act as a generator. By immediately applying the load across the motor in such a state, any energy created by motor momentum is rapidly absorbed in the load since the motor operates as a generator, thereby rapidly stopping the motor.

The preferred configuration of the power shaft 22 used with the present invention is depicted in FIG. 5. The aforementioned control techniques are best applied to the power shaft configured in accordance with FIG. 5. At the top of the power shaft, is a slot 73 to hold antibacklash spring 20, as exemplified in FIG. 11. Spacers 51(*a*) and 51(*b*) are preferably constituted by stainless steel washers, having a size of 0.120 inches ×0.378 inches ×0.900 inches. Beneath these two spacers is sector gear 21, preferably constituted by a structure 0.125 inches ×0.375 inches 1.9 inches 24 T 120 P in size. Aluminum spacer 52(*a*) is arranged to separate sector gear 21 from delrin gear 55. Spacer 52(*a*) is preferably 0.250 inches ×0.375 inches ×1.375 inches. The delrin gear is constituted by a piece 0.187 inches ×0.375 inches ×1.83 inches 42T 24P in size. A second spacer 52(*b*) is also constituted by an aluminum piece the same size as spacer 52(*a*). Slip clutch spring 29 is arranged below spacer 52(*b*), and is supported by spacer 51(*c*), a stainless steel washer the same size as 51(a). Roll pin 53 holds washer 51(c) against slip clutch spring 29. A snap ring 56 is arranged against a stainless steel spacer 57(a). This is separated from a second stainless steel spacer 57(b) by a stainless steel spacer 58. This latter piece is constituted by a structure 0.095 inch ×0.390 inch ×0.655 inch ×0.008 inch in size. The spacers 57(a) and 57(b) are both constituted by pieces 0.048 inches ×0.400 inches ×0.875 inches in size. While an ideal drive shaft configuration (as depicted in FIG. 5) has been illustrated for one version of the present invention, other shaft arrangements can be practiced with the present invention without modifying the basic concepts thereof.

While detection of spurious ultrasonic reflections can be limited by configuring the sensor bar 5 as previously described, the irregularities in the surface of trailer 3 can also cause mismeasurements or spurious measurements. Examples of such irregularities in the trailer are support brackets, connectors, extensions of exhaust manifolds, and refrigeration units such as 3(a). In order to avoid interference by such irregularities on the trailer, a uniform reflecting bar 140 is arranged so that it is parallel with the rear of the tractor 1, as well as the surfaces 110(a) and 110(b) of transducer bar 5. As a result of using this arrangement, direct radiation from the transducers (6,7,8) will move along straight lines directly to the reflecting bar 140 and from there back to the transducers, without interference from any other part of either the tractor or the trailer. The reflecting bar 140 can be mounted on the trailer by the use of mounting brackets 141 so as to be at an optimal position with respect to reflecting ultrasonic transmissions from the transducer bar. By using a precise measurement between the reflecting bar and the transducer bar, precise timing requirements can be programmed into the controller to further eliminate misreadings due to spurious reflections.

In summary, the present invention provides a mirror tracking system automatically driving a side view vehicle mirror to keep it in alignment with the turning of an articulated vehicle so that a rear side corner of the vehicle is always in view of the vehicle operator.

While these embodiments and variations have been described and illustrated, it is clear that variations in the details of these embodiments may be made without departing from the true spirit and scope of the invention as defined in the appended claims. For example, more than three ultrasonic transducers can be used in the first embodiment of the invention. Further, these transducers can be mounted anywhere on the top of the tractor as long as the full radiation pattern of the ultrasonic transducers is permitted to propagate. Further, while piezoelectric transducers have been described, electrostatic ultrasonic transducers can be substituted if such transducers have the characteristics necessary to withstand the operating environment. This environment can change depending upon the vehicle using the present invention. For example, the articulated vehicle may be a piece of construction equipment, and more than one mirror can be controlled. Also, the programming of the microprocessor controlling the mirror movement can be altered so that a pattern of different viewing angles are displayed as the vehicle moves, rather than just the view of the rear side corner of the trailer as illustrated in the appended drawings.

Although the present invention has been described and illustrated in detail, it is clearly understood that the same as by way of illustration and example only and is not to be taken by way of limitation, the spirit and scope of the present invention being limited only by the terms of the following claims.

I claim:

1. An automatic mirror position tracking system for use on an articulated vehicle having a first portion and a second portion, the system comprising:
   (a) a mirror moveably mounted on the first portion of the articulated vehicle;
   (b) a drive mechanism coupled to the mirror for moving the mirror in response to a control signal;
   (c) first, second and third pairs of ultrasonic transducers, each said pair of ultrasonic transducers being arranged to transmit and receive in conjunction ultrasonic signals reflected off said second portion, each said ultrasonic transducer in each said ultrasonic transducer pair being directed at a horizontal angle in the range of 10°–15° away from the other transducer of said transducer pair, and each said ultrasonic transducer pair being arranged to receive reflected ultrasonic signals from at least two other ultrasonic transducer pairs; and,
   (d) a control circuit for generating said control signal in response to sensory output signals of said first, second and third ultrasonic transducer pairs, said control circuit being configured to carry out real time calculation of angles between first and second portions.

2. The system of claim 1, wherein said control circuit includes means for calculating said angle between said first and second portions based solely upon spacing between said transducer pairs and output from said transducer pairs.

3. The system of claim 2, wherein said control circuit generates signals for moving said mirror a predetermined increment corresponding to a change in angle between the first and second portions.

4. The system of claim 3, wherein said control circuit further comprises feedback means for providing a signal representative of a position of said mirror, and a microprocessor for generating the control signal in response to the said signal representative of a position of said mirror and output signals from said transducers.

5. The system of claim 4, wherein said feedback means comprise a magnetic encoder coupled to said mirror.

6. The system of claim 4, wherein said feedback means further comprise a potentiometer coupled to the mirror.

7. The system of claim 6, wherein said drive mechanism comprises a DC motor coupled to the mirror.

8. The system of claim 7, wherein said drive mechanism further comprises a reduction gear head providing a mechanical coupling between the DC motor and the mirror.

9. The system of claim 8, wherein said transducers of said first, second and third transducer pairs are piezoelectric devices.

10. The system of claim 9, wherein the piezoelectric devices have an asymmetrical radiation pattern.

11. The system of claim 10, wherein said drive mechanism comprises a spring coupled between said mirror and said DC motor, providing tension against a direction of motor movement.

12. The system of claim 11, further comprising dynamic breaking means for controlling over movement of said motor.

13. The system of claim 12, further comprising means for reducing reception of undesirable ultrasonic radiation at said transducers arranged for receiving reflected ultrasonic radiation.

14. A method of adjusting a mirror to track changes in vehicle position for an articulated vehicle having first and second portions by using a system having a mirror, a motor arranged to move said mirror, position detecting means for determining actual mirror position, distance measuring means, and a control circuit, said method comprising the steps of:

(a) obtaining vehicle distance measurements;

(b) calculating an angle between said first and second portions using at least one trigonometric algorithm;

(c) determining desired mirror position based upon said calculated angle;

(d) determining actual mirror position based upon said position detecting means; and, (e) adjusting said mirror based upon a comparison of said desired mirror position and said actual mirror position;

wherein each transducer pair has one transducer configured only for transmission and a second transducer configured only for reception so that step (a) further comprises emitting ultrasonic radiation from one transducer of each said transducer pair and receiving ultrasonic radiation from a plurality of sources at each ultrasonic transducer pair;

wherein step (a) comprises the sub-step of emitting ultrasonic radiation from at least three ultrasonic transducers;

wherein step (b) comprises using only data obtained from said distance measuring step and distances between said ultrasonic transducers; and, wherein step (a) further comprises directing the transducers of each said transducer pair at a 10°–15° alignment with respect to each other.

15. The method of claim 14, wherein step (e) comprises the operation of adjusting mirror position 0.5° for every 1° in change of said calculated angle.

16. The method of claim 15, wherein step (a) further comprises obtaining at least 5 measurements and averaging them over time.

17. The method of claim 16, wherein said calculated angle is averaged with a plurality of previously calculated angles.

18. The automatic mirror position tracking system of claim 1, further comprising a planer surface mounted on the second portion of the articulated vehicle, and aligned to receive signals in a straight line from said first, second and third pairs of ultrasonic transducers.

* * * * *